(12) United States Patent
Cordes et al.

(10) Patent No.: US 10,159,392 B2
(45) Date of Patent: Dec. 25, 2018

(54) VACUUM CLEANER SUCTION TUBE (71) Applicant: Fischer Rohrtechnik GmbH, Achern-Fautenbach (DE)

(72) Inventors: Martin Cordes, Sundern (DE); Stephan Cordes, Arnsberg (DE)

(73) Assignee: FISCHER ROHRTECHNIK GMBH, Achern-Fautenbach (DE)

( * ) Notice: Subject to any disclaimer, the term of this patent is extended or adjusted under 35 U.S.C. 154(b) by 1206 days.

(21) Appl. No.: 14/322,951

(22) Filed: Jul. 3, 2014

(65) Prior Publication Data
US 2015/0014985 A1 Jan. 15, 2015

(30) Foreign Application Priority Data
Jul. 5, 2013 (DE) .......................... 10 2013 213 212

(51) Int. Cl.
*F16L 27/12* (2006.01)
*A47L 9/24* (2006.01)
*F16B 7/10* (2006.01)

(52) U.S. Cl.
CPC .............. *A47L 9/244* (2013.01); *F16B 7/105* (2013.01); *F16L 27/12* (2013.01)

(58) Field of Classification Search
USPC ..................................... 285/7, 298, 301–303
See application file for complete search history.

(56) References Cited

U.S. PATENT DOCUMENTS 5,682,782 A 11/1997 Rosene et al.
5,692,782 A 12/1997 Fischer

FOREIGN PATENT DOCUMENTS

| DE | 295 20 214 U1 | 4/1996 |
| DE | 197 06 210 A1 | 8/1998 |
| DE | 298 08 231 U1 | 10/1998 |
| DE | 200 01 792 U1 | 12/2000 |
| DE | 203 05 233 U1 | 6/2003 |

*Primary Examiner* — Aaron M Dunwoody
*Assistant Examiner* — Fannie C Kee
(74) *Attorney, Agent, or Firm* — David S. Safran; Roberts Mlotkowski Safran Cole & Calderon, P.C.

(57) ABSTRACT

A vacuum cleaner suction tube, having an inner tube received in an outer tube, is provided with an actuating mechanism having a grip structure provides a minimized risk of blocking. A clamping element has a form-fit connection with a pair of clamping wedges, so that both of the clamping wedges can be simultaneously moved with a single movement of a clamping element that is connected to the grip structure so that the clamping element is moved away from the longitudinal axis of the vacuum cleaner suction tube by sliding the grip structure out of the locking position, and both clamping wedges are simultaneously lifted out of engagement with retaining recesses of the inner tube by moving the clamping element away from the longitudinal axis of the vacuum cleaner suction tube, whereby sliding of the inner tube is enabled relative to the outer tube.

15 Claims, 12 Drawing Sheets

VACUUM CLEANER SUCTION TUBE

BACKGROUND OF THE INVENTION

Field of the Invention

The present invention relates to a vacuum cleaner suction tube having at least one inner tube and at least one outer tube, wherein the inner tube has a plurality of retaining recesses, wherein an actuating mechanism is arranged on the outer tube, wherein the actuating mechanism includes at least a grip structure, a re-setting means, a clamping element and two clamping wedges, wherein the grip structure is slidably held in the longitudinal direction of the vacuum cleaner suction tube, so that the grip structure is movable from one locked position into at least one unlocked position, wherein, in the locked position of the grip structure, the clamping element keeps the clamping wedges engaged with the retaining recesses on the inner tube, wherein in the unlocked position, a sliding of the inner tube relative to the outer tube is enabled by the clamping wedges, and wherein, when the grip structure is displaced out of the locked position, the re-setting means exerts a re-setting force for re-setting the grip structure into the locked position.

Description of Related Art

Vacuum cleaner suction tubes are known in the prior art in a plurality of designs. Vacuum cleaner suction tubes normally include at least two tubes that are slidable in relation to one another, whereby the length of the vacuum cleaner suction tube is adjustable. Thereby, often, at least one inner tube and at least one outer tube are present, wherein the inner tube is inserted into the outer tube. The outer contour of the inner tube corresponds essentially to the inner contour of the outer tube. The inner tube has retaining recesses, thereby, that interact with an actuating mechanism held on the outer tube, for example, in that clamping wedges of the actuating mechanism engage in the retaining recesses and thereby block movement of the inner tube relative to the outer tube. A movement of the inner tube relative to the outer tube for setting the length of the vacuum cleaner suction tube is made possible when the clamping wedges come out of engagement with the retaining recesses or can be pushed out of them with only minimal resistance in that the user exerts a pushing force.

For example, German Utility Model DE 295 20 214 U1 discloses a telescopic vacuum cleaner suction tube with a slider that can be slid from the locked position into an unlocked position. The slider lifts a clamping element up, so that the present clamping wedges are pushed out of the retaining recesses in the inner tube by the force exerted on the tubes by the user and, thus, a sliding of the inner tube relative to the outer tube is ensured.

The vacuum cleaner suction tubes known from the prior art have the disadvantage that the actuating mechanism is easily blocked.

SUMMARY OF THE INVENTION

Based on the above-mentioned prior art, a primary object of the present invention is to provide a vacuum cleaner suction tube with an actuating mechanism that has a minimized risk of blocking.

The above object is initially and essentially met with a vacuum cleaner suction tube according to the invention in that the clamping element has a form-fit connection with the clamping wedges, so that both clamping wedges can be simultaneously moved with one movement of the clamping element, and that the clamping element is connected to the grip structure so that the clamping element is moved away from the longitudinal axis of the vacuum cleaner suction tube by sliding the grip structure out of the locking position, and that both clamping wedges are simultaneously lifted out of engagement with the retaining recesses by moving the clamping element away from the longitudinal axis of the vacuum cleaner suction tube, whereby sliding of the inner tube is enabled relative to the outer tube. The vacuum cleaner suction tube can make a telescope movement thereby, i.e., is adjustable in respect to length. After releasing locking between inner tube and outer tube by the actuating mechanism, the inner tube is slidable within the outer tube.

The actuating mechanism includes a grip structure, which can be operated by the user with one hand. The grip structure is slidably held on the outer tube in the longitudinal direction of the vacuum cleaner suction tube. The grip structure is in a locked position without activation by the user, wherein the grip structure is preferably movable in the longitudinal direction of the vacuum cleaner suction tube, i.e., in two directions, each into an unlocked position. For handling the actuating mechanism, the vacuum cleaner suction tube is, for example, held by a user at the grip structure and on the inner tube, wherein, after sliding the grip structure out of the locked position, the inner tube can be pushed into the outer tube as well as pulled out of the outer tube, advantageously, a sliding occurs in the direction opposite the direction that the grip structure was slid.

The actuating mechanism includes a re-setting means that influences the grip structure in such a manner that it is always re-set preferably from both unlocked positions into the locked position, so that the user always moves the grip structure against a re-setting force of the re-setting means out of the locked position. The re-setting means braces itself directly or indirectly on the outer tube, for example, as counter bearing.

The actuating mechanism further includes at least one clamping element and at least two clamping wedges, which are preferably arranged within the grip structure, i.e., are surrounded by the grip structure. In the locked position of the grip structure, the clamping wedges are kept engaged with the retaining recesses in the inner tube by the clamping element so that a sliding of the inner tube relative to the outer tube is blocked by the form-fit engagement of the clamping wedges in the retaining recesses of the inner tube. The clamping element has a form-fit connection with the clamping wedges, so that moving the clamping element always simultaneously moves the clamping wedges, a first clamping wedge and a second clamping wedge. Both clamping wedges follow a movement of the clamping element.

Additionally, the clamping element is connected with the grip structure, or is in contact with the grip structure, so that the clamping element is moved away from the longitudinal axis of the vacuum cleaner suction tube, in particular in a direction perpendicular to the longitudinal direction of the vacuum cleaner suction tube, when the grip structure is slid out of the locked position into an unlocked position.

By connecting the clamping element with the grip structure, sliding the grip structure always leads to a movement of the clamping element. Thereby, the clamping element moves, in particular, away from the vacuum cleaner suction tube. By moving the clamping element in a direction away from the longitudinal axis of the vacuum cleaner suction tube, in particular in a direction perpendicular to the longitudinal axis of the vacuum cleaner suction tube, both clamping wedges are moved together with the clamping element, namely simultaneously lifted out of engagement with the retaining recesses, whereby a sliding of the inner tube relative to the outer tube is enabled. Thereby, the form-fit engagement of the clamping wedges with the retaining recesses is cancelled, when the grip structure is in the unlocked position. The clamping wedges are, thereby, also moved away from the longitudinal axis of the vacuum cleaner suction tube.

If the grip structure is released in the unlocked position, but no retaining recesses are positioned so that the clamping wedges are directly engaged, they are held by spring force and lock into the next available retaining recesses in the inner tube after a relative movement of the inner tube to outer tube. The grip structure and the clamping element preferably interact with one another in such a manner that a movement of the clamping element into the locked position of the grip structure is also blocked by the grip structure, whereby a movement of the inner tube relative to the outer tube is also blocked.

The vacuum cleaner suction tube has the advantage that releasing of the locking between inner tube and outer tube can occur in two directions, namely by sliding the grip structure in any direction in the longitudinal direction of the vacuum cleaner suction tube. The movement of the clamping wedge follows the movement of the clamping element, so that a complete release of the locking always occurs, without the clamping wedges grinding over the surface of the inner tube.

In particular, to improve the interaction of the moved components of the actuating mechanism, it is provided according to first embodiment that the actuating element additionally includes a clamp spring and that a movement of the clamping element away from the longitudinal axis of the vacuum cleaner suction tube occurs against the force of the clamp spring. The clamp spring is arranged for this in such a manner that it preferably exerts a force perpendicular to the longitudinal axis of the vacuum cleaner suction tube, in particular directly on the clamping element. In the locked position of the grip structure, the clamp spring keeps the clamping element in its clamping position, in which the clamping wedges are kept engaged with the retaining recesses on the inner tube. The clamp spring is not necessarily strained in this position, rather it is possible that absolutely no load is exerted on the spring, wherein a load on the spring occurs as soon as the clamping element is moved out of the clamping position, namely the grip structure is moved out of the locked position. Alternatively, the clamp spring always exerts a force on the clamping element directed perpendicular to the longitudinal axis of the vacuum cleaner suction tube.

In order to ensure an advantageous guiding of the clamping wedges and the clamping element, it is provided, according to a further embodiment, that a housing is provided between the grip structure and the outer tube, and that the clamping element and both clamping wedges are held and guided in the housing. The housing is arranged between the grip structure and the outer tube and includes the clamping element and both clamping wedges. The arrangement of the clamping wedges and the clamping element within the housing leads to a reliable guiding of the clamping wedges and the clamping element.

Preferably, the clamping wedges are guided within the housing each on a beveled plane, which is sloped in the direction of the position of the clamping element on both sides of the housing in the longitudinal direction of the vacuum cleaner suction tube. In particular, the clamping element is centrally arranged within the housing. The clamping wedges are advantageously formed in a plate shape and have an angled recess inside the plate-shaped body, wherein the clamping element at least partially being engaged in the angled recesses in the mounted state. The angle corresponds to the slope of the sloped planes for guiding the clamping wedges. Preferably, an extension is additionally formed on the plate-shaped body, which presents an extension of at least one inner surface of the recess and, in respect to the plate-shaped body, is arranged at an angle at which the recess is also presented. This extension stabilizes the mechanical interaction between the clamping element and the clamping wedges and, in particular, inhibits blocking.

Attaching the actuating mechanism on the outer tube is simplified according to a further embodiment in that the actuating mechanism includes a guide sleeve and that the guide sleeve is inserted in the end of the outer tube, in particular locked form-fit with the outer tube. The outer tube is preferably locally expanded preferably on at least one end for attaching the guide sleeve, so that the guide sleeve can be inserted into the expansion at the end of the outer tube. Advantageously, the insertion of the guide sleeve in the outer tube leads to the guide sleeve reproducing the original inner diameter of the outer tube in the area of the expansion so that the inner tube is reliably guided by the guide sleeve. Furthermore, the guide sleeve is used for attaching the housing of the actuating mechanism. For this, a recess is provided in the outer tube that is at least partially clamped by the housing and/or by the guide sleeve, so that the housing, for example, can be attached form-fit on the guide sleeve.

According to a further embodiment of the vacuum cleaner suction tube, it is preferred when it is provided that the re-setting means is attached to the guide sleeve, in particular, at least partially attached form-fit to the guide sleeve. The guide sleeve is inserted into the end of the outer tube, so that advantageously, also the re-setting means is arranged within the outer tube, insofar as this is attached to the guide sleeve. The outer tube has a recess for interaction of the re-setting means with the grip structure, through which the re-setting means and the grip structure can interact. The re-setting means is preferably attached form-fit to the guide sleeve, for example, in that it is at least partially inserted in a recess within the guide sleeve or arranged on a clamping nose and held form-fit.

Furthermore, it has been seen to be of particular advantage in a further embodiment, when it is provided that a setting lug is provided on the grip structure, that the setting lug passes the outer tube through a recess, and that the setting lug interacts with the re-setting means arranged in the outer tube. The grip structure has a setting lug that is preferably integrally formed with the grip structure. The setting lug extends, for example, from the grip structure perpendicular to the direction of the central axis—the longitudinal axis—of the vacuum cleaner suction tube and has a length that is sufficient for interacting with the re-setting means arranged on the guide sleeve. In particular, the setting lug engages form-fit into the re-setting means so that an advantageous transmission of force is possible between the re-setting means and the grip structure. For example, a separate recess is provided, through which the setting lug passes the outer tube, and a separate recess is provided, through which the guide sleeve and/or the possibly present housing passes the outer tube.

For ensuring a sufficient re-setting force when sliding the grip structure out of the locked position, it is provided in a further embodiment that the re-setting means is designed as at least one leaf spring, in particular as at least one arched leaf spring that is strained perpendicular to its arched shape. The arched spring is preferably arranged within the guide sleeve and at least partially attached form-fit on the guide sleeve. A leaf spring, i.e., a spring cut or stamped from a spring steel sheet, is notably suitable as re-setting means since such a leaf spring allows for a sufficient amount of force for re-setting the grip structure while simultaneously having a compact configuration. Preferably, the leaf spring has an arched shape so that the leaf springs are adapted to the outer contour of the vacuum cleaner suction tube or on the inner contour of the outer tube. The leaf spring is, for example, set on the guide sleeve and nestles on the outer contour of the guide sleeve. Furthermore, it is also provided that the leaf spring is attached to the housing.

The leaf spring is, thereby, advantageously arranged in such a manner that it is strained perpendicular to its arched form when the grip structure is moved. This means that the leaf spring is strained in the orthogonal direction of a plane that is spanned by the arched course of the leaf spring. Preferably, leaf springs as re-setting means are arranged both in front of and behind a setting lug of a grip structure, so that a re-setting force is exerted by one of the leaf springs on the grip structure at every possible movement of the grip structure—out of the locked position into one of the two unlocked positions.

In particular, a sufficient re-setting force on the clamping element is ensured according to a further embodiment, in that the clamp spring is designed as a leaf spring, in particular as a double-layer leaf spring. Preferably, the clamp spring is held in the housing, in which the clamping element and the clamping wedges are also held and guided. The leaf spring preferably braces itself against the housing and directly or indirectly influences the clamping element. Preferably, the clamp spring is designed and arranged in such a manner that it holds the clamping element in the clamping position in its completely unstrained state. As soon as the clamping element is moved out of its clamping position, consequently the grip structure also out of the locked position, the clamp spring is also loaded and strained, whereby the clamp spring produces a spring force, which is intended to guide the clamping element back into the clamping position. A re-setting of the grip structure into the locked position also simultaneously takes place, thereby.

In particular, an advantageous transmission of force between the clamping element and the clamping wedges is ensured according to a further embodiment in that the clamping element is designed as a clamping plate, which includes two setting arms arranged in a common plane and in that each setting arm clamps form-fit into a clamping wedge, in particular in that the setting arms are oriented parallel to the longitudinal direction of the vacuum cleaner suction tube. The clamping element, which is designed as clamping plate, consequently includes two setting arms, which are arranged opposite one another and preferably in the same plane. A movement of the clamping plate in the mounted state occurs advantageously in the orthogonal direction of the common plane of the setting arms.

In the mounted state, each setting arm clamps into a clamping wedge and thereby produces the form-fit connection between the clamping plate and the clamping wedges, which is necessary to simultaneously move both clamping wedges with one movement of the clamping plate. The setting arms are preferably arranged in such a manner that they extend parallel to the longitudinal axis of the vacuum cleaner suction tube and, in this arrangement, also hold the clamping wedges, which interact with the retaining recesses—which are also arranged in the longitudinal direction of the inner tube—provided on the inner tube.

In order to interact in a simple manner with the grip structure, it is provided according to a further embodiment of the vacuum cleaner suction tube that the clamping element has two lifting arms oriented orthogonally to the longitudinal direction of the vacuum cleaner suction tube, that the lifting arms engage into corresponding, V-shaped shaft guides in the grip structure, and that sliding the grip structure out of the locked position leads to the lifting arms sliding up along a flank of the V-shaped shaft guides, whereby the clamping element is moved against the spring force of the clamp spring.

The lifting arms of the clamping element are arranged orthogonally to the sliding direction of the grip structure in the mounted state, wherein the lifting arms engage into two oppositely arranged V-shaped guide shafts in the grip structure. When the grip structure is moved out of the locked position, the lifting arms slide—depending on the direction of movement—up along one of the two flanks of the V-shaped guide shaft, whereby the clamping element is moved in a direction orthogonal to the longitudinal direction of the vacuum cleaner suction tube or against the spring force of the clamp spring. The clamping element is, consequently, moved away from the longitudinal axis of the vacuum cleaner suction tube. The clamping wedges are lifted out of engagement with the retaining recess on the inner tube due to the movement of the clamping element, whereby a telescope movement of the vacuum cleaner suction tube is ensured.

In an embodiment, in which the clamping element and the clamping wedges are arranged in a common housing, it is provided that the lifting arms extend out of the sides of the housing, so that they can interact with the V-shaped shaft guides in the grip structure.

According to a further advantageous embodiment, it is provided that the actuating mechanism includes a pivot bar, that the pivot bar is in contact with the grip structure and with the clamping element, so that sliding the grip structure out of the locked position actuates the pivot bar, whereby the clamping element is moved away from the longitudinal axis of the vacuum cleaner suction tube. The pivot bar is preferably connected to the clamping element. In particular, the pivot bar is in contact with a pivot edge, which allows for a swiveling of the pivot bar. The pivot bar is actuated for this on the end opposing the clamping element, namely the averted end is moved in the direction of the vacuum cleaner suction tube, so that the pivot bar is swiveled like a lever over the pivot edge, whereby the clamping element is moved away from the longitudinal axis of the vacuum cleaner suction tube. Actuating the pivot bar occurs, in particular, by sliding the grip structure out of the locked position into one of the unlocked positions. The pivot bar is preferably made of metal. For example, the pivot bar has a basic U shape. The open side of the U shape is advantageously oriented in the direction of the clamping element.

Actuating the pivot bar can be particularly advantageously implemented according to a further embodiment when it is provided that at least one initiating bevel is provided on the grip structure and that the pivot bar slides over the initiating bevel when the grip structure is slid out of the locked position, whereby the pivot bar is actuated. Preferably, the grip structure has two oppositely arranged initiating bevels, which are arranged in a V shape, so that actuating the pivot bar occurs when the grip structure is slid into either of the unlocked positions. For example, the initiating bevel is integrally formed with the grip structure.

Operating the vacuum cleaner suction tube can be simplified according to a further embodiment in that the grip structure encloses the entire circumference of the outer tube, in particular, that the grip structure is designed as two pieces. Optionally, the grip structure is designed in such a manner that it can be slid onto the outer tube and thus encloses the entire circumference of the outer tube on one end. Alternatively, it is provided that the grip structure is designed in two pieces, so that the outer tube is enclosed on one end by two joined halves of the grip structure. For a user, who wants to unlock the actuating mechanism for a telescope movement of the vacuum cleaner suction tube, actuating the grip structure—the actuating mechanism—is easily possible, since this can be easily gripped with one hand. Furthermore, the further components of the actuating mechanism can be arranged in the grip structure.

The object is further met with a vacuum cleaner suction tube of the type being discussed here in that the re-setting means is designed as at least one arched leaf spring that is strained perpendicular to its arched form when the grip structure is moved and thereby exerts a re-setting force on the grip structure. The use of an arched spring has the advantage that a large spring force can be exerted with a compact configuration, which is large enough to overcome blocking in the actuating mechanism.

In detail, there are a number of possibilities for designing and further developing the vacuum cleaner suction tube according to the invention as will be apparent from the following description of preferred embodiments in conjunction with the accompanying drawings.

DETAILED DESCRIPTION OF THE INVENTION

Figure 1:
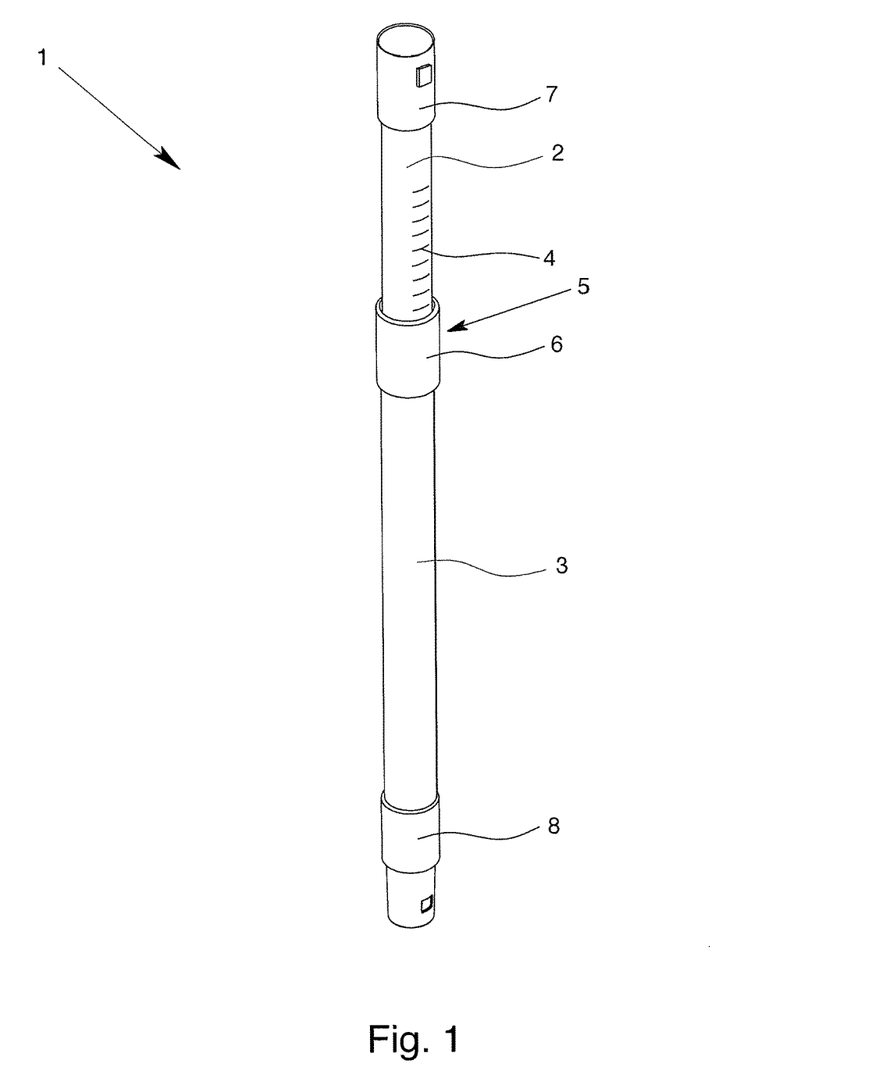
FIG. 1 is a perspective view of an embodiment of a vacuum cleaner suction tube.

FIG. 1 shows a vacuum cleaner suction tube 1 with an inner tube 2 and an outer tube 3. The inner tube 2 has a plurality of retaining recesses 4 that interact with an actuating mechanism 5 arranged on the outer tube 3. The actuating mechanism 5 includes a grip structure 6 that can be gripped by the user and is slidably held in the axial direction of the vacuum cleaner suction tube 1, so that the grip structure 6 can be slid from the locked position shown in FIG. 1 into two unlocked positions. The grip structure 6 can be slid in the direction of the free end of the inner tube 2 as well as in the direction of the free end of the outer tube 3. A first connecting element 7 on the inner tube 2 and a second connecting element on the outer tube 3 are arranged on the ends of the vacuum cleaner suction tube 1. The first connecting element 7 and the second connecting element 8 are used to connect the vacuum cleaner suction tube to a suction hose (not shown), on the one hand, and to a vacuum cleaner head (not shown) on the other hand.

Figure 2:
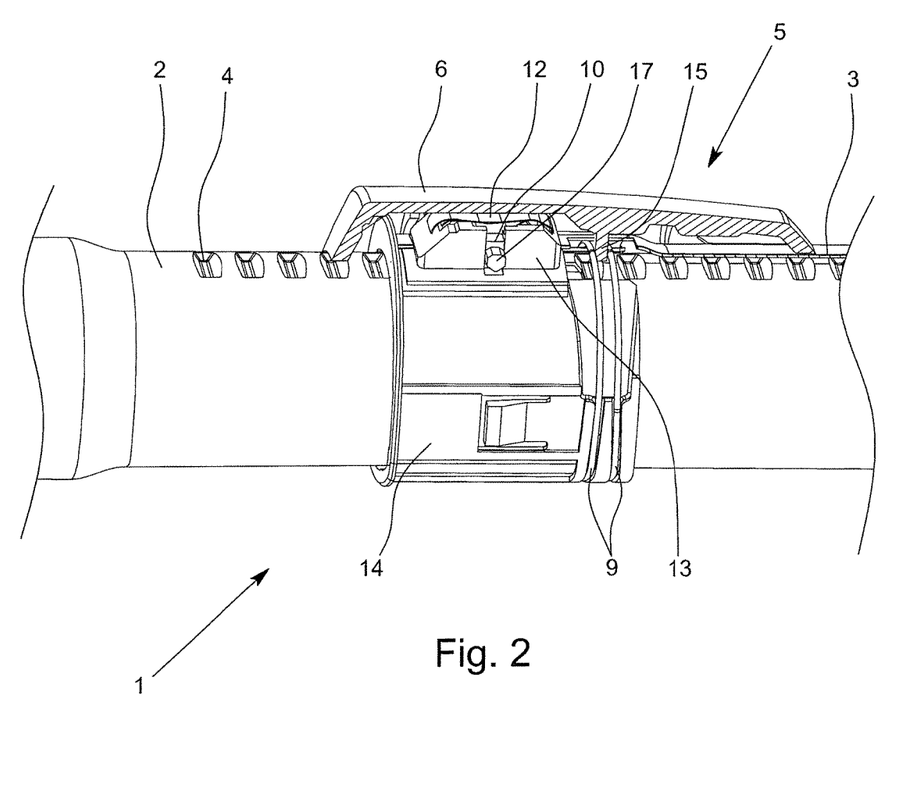
FIG. 2 is a partial cross-sectional view of an embodiment of a vacuum cleaner suction tube.

FIG. 2 shows a partial cross-sectional perspective view of a partially mounted embodiment of a vacuum cleaner suction tube 1 having an inner tube 2 and an outer tube 3. The inner tube 2 has a plurality of retaining recesses 4 that interact with the actuating mechanism 5, which is arranged and attached on the outer tube 3. The grip structure 6 is shown partially mounted and in cross-section, so that an inner configuration of the actuating element 5 is observable. The outer tube 3 is also shown in cross-section at the same level, wherein the lower part cannot be seen in this illustration. The grip structure 6 is formed, in total, of two pieces, wherein only the cut, top half is shown. The actuating mechanism 5 includes a re-setting means 9 within the grip structure 6, which is formed as two partially open rings that are made of spring steel in this embodiment. Furthermore, the actuating mechanism 5 includes a clamping element 10.

The grip structure 6 of the actuating mechanism 5 is held in the locked position, slidably in the longitudinal direction of the vacuum cleaner suction tube 1 in both directions, i.e., in the direction of either end of the vacuum cleaner suction tube 1. The re-setting means 9 influences the grip structure 6 in such a manner that it is always re-set into the locked position when it is moved into the unlocked position, namely a re-setting force is exerted for re-setting the grip structure 6 back into the locked position.

Figure 3:
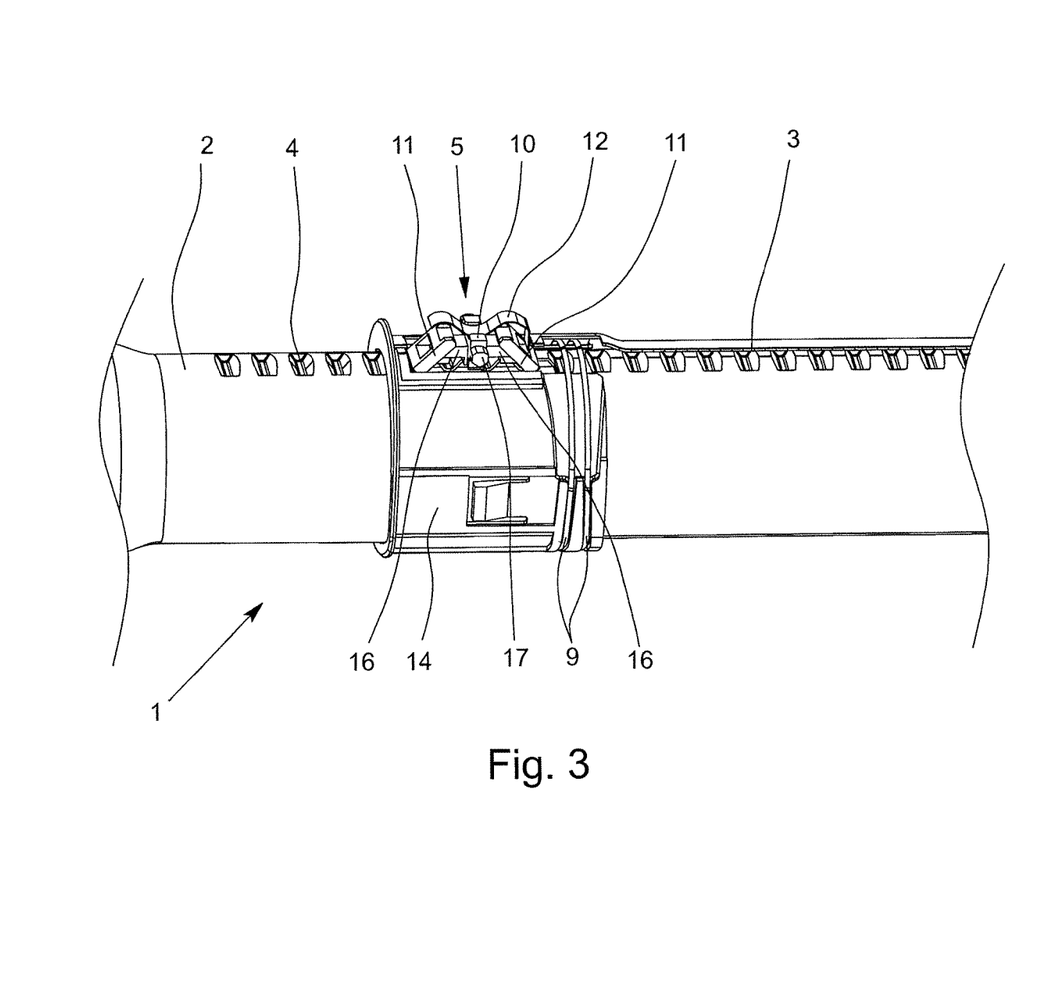
FIG. 3 is a in a partial cross-sectional view of the embodiment according to FIG. 2 in a partially mounted state.

FIG. 3 shows the embodiment of a vacuum cleaner suction tube 1 according to FIG. 2, which is partially sectional and partially mounted. The portion of the actuating mechanism 5 shown includes the re-setting means 9, the clamping element 10 and two clamping wedges 11. According to FIG. 3, the actuating mechanism 5 additionally includes a clamp spring 12, which is designed as a leaf spring in this embodiment. The clamp spring 12 is unstrained in the illustrated locked state, but acts on the clamping element 10 in such a manner that the clamping element 10 is kept engaged with the retaining recesses 4 on the inner tube 2. Not before the clamping element 10 is orthogonally moved away from the longitudinal axis of the vacuum cleaner suction tube 1, does the clamp spring 12 exert a spring force on the clamping element 10, whereby it is intended to re-set the clamping element 10 into the clamping position.

The clamping element 10 has a form-fit connection with the clamping wedges 11, so that both clamping wedges 11 can be simultaneously moved by moving the clamping element 10, namely toward the vacuum cleaner suction tube 1 as well as away from it. In the clamping position of the clamping element 10, both clamping wedges 11 are kept in form-fit engagement with the retaining recesses 4 on the inner tube 2, so that a movement of the inner tube 2 relative to the outer tube 3 is blocked.

A housing 13 is arranged between the grip structure 6 and the outer tube 3, and in FIG. 2, the clamping wedges 11 and the clamping element 10 are held in the housing 13. The outer tube 3 is expanded on the end directed toward inner tube 2 and as shown in FIG. 2 and FIG. 3, a guide sleeve 14 is pushed into the expanded end of the outer tube 3 and is locked with the outer tube 3 in a form-fit manner. The housing 13 is connected to the guide sleeve 14 via a recess in the outer tube 3. The housing 13 has two planar surfaces that are inclined toward one another, along which the clamping wedges 11 glide when the clamping element 10 is moved. The angle of the inclined planar surfaces of the housing 13 corresponds to the angle of the clamping wedges 11 according to FIG. 3.

According to FIG. 2, a setting lug 15 is provided on the grip structure 6, which passes the outer tube 3 through a separate recess and interacts with the re-setting means 9 arranged in the outer tube 3. The setting lug 15 is arranged between the two circular springs that form the re-setting means 9 in such a manner that a re-setting of the grip structure 6 is always the intention when moved out of the locked position.

According to FIG. 3, two setting arms 16 are provided in one common plane on the clamping element 10, which engages form-fit into each clamping wedge 11 in order to move them. The setting arms 16 are oriented parallel to the longitudinal direction—longitudinal axis—of the vacuum cleaner suction tube 1 according to FIG. 3. Two lifting arms 17 are arranged opposite one another on the clamping element 10, orthogonal to the setting arms 16, the lifting arms allowing for interaction between the clamping element 10 and the grip structure 6.

Figure 4:
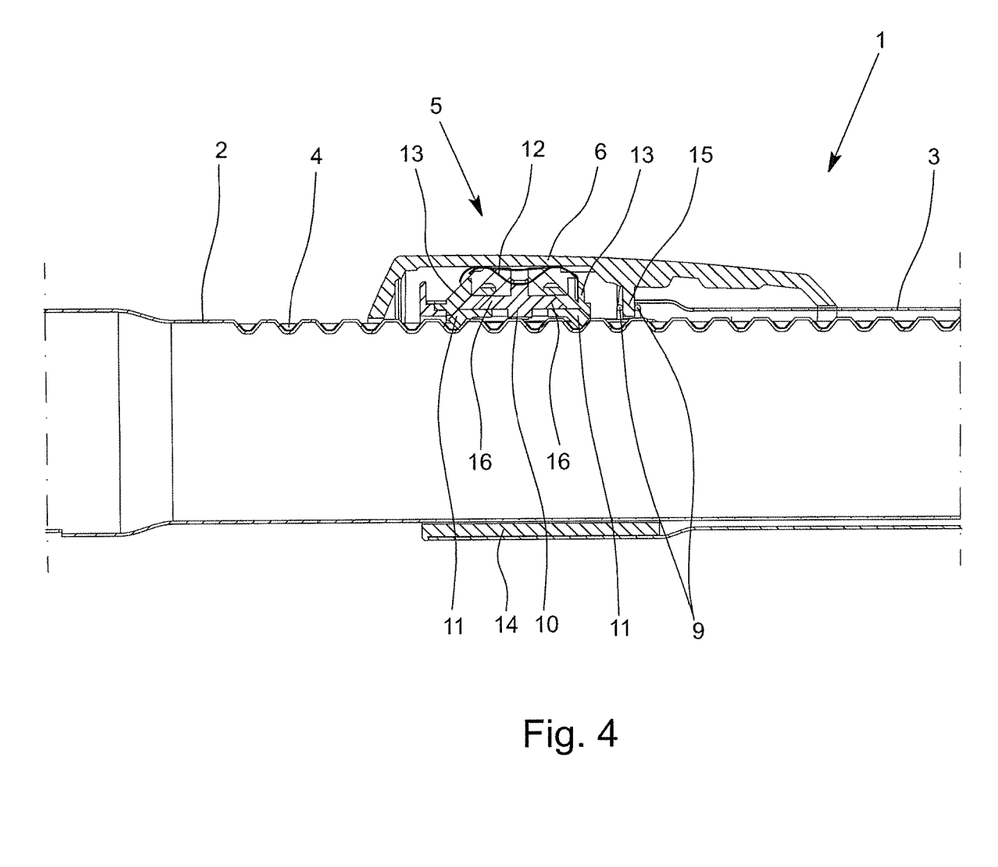
FIG. 4 is a cross-sectional view of the embodiment according to FIG. 2.

FIG. 4 shows a cross-sectional side view of the embodiment of a vacuum cleaner suction tube 1 according to FIG. 2 with the outer tube 3 and the inner tube 2. The inner tube 2 has retaining recesses 4 that interact with the clamping wedges 11 of the actuating mechanism 5, in that the clamping wedges 11 engage form-fit into the retaining recesses 4 in the locked position—which is shown—of the grip structure 6. The housing 13 is arranged between the grip structure 6 and the outer tube 3, wherein the clamping wedges 11 and the clamping element 6 are arranged in the housing 13. The clamping wedges 11 glide on a tilted plane on the housing 13.

The outer tube 3 has a separate recess for the setting lug 15 and a further recess for the housing 13. The housing 13 is pushed through the recess in the outer tube 3 from inside to out. The clamp spring 12 has two layers and is held on the housing 13. The clamp spring 12 is in the unstrained state and holds the clamping element 10 in the clamping position, so that the clamping wedges 11 are also engaged with the retaining recesses 4 of the inner tube 2. When moving the grip structure 6 out of the shown locked position, the clamping element 10 is lifted, namely moved away from the longitudinal axis of the vacuum cleaner suction tube 1, so that the clamping wedges 11 are also lifted out of engagement with the retaining recesses 4 of the inner tube 2, whereby a movement of the inner tube 2 relative to the outer tube 3 is enabled. Whenever the grip structure 6 is moved out of the locked position, the re-setting means 9 strives to re-set it back into the locked position. In the longitudinal direction of the vacuum cleaner suction tube 1, a ring of spring steel of the re-setting means 9 is arranged both in front of and behind the setting lug 15; the re-setting means 9 being formed here by these rings.

Figure 5:
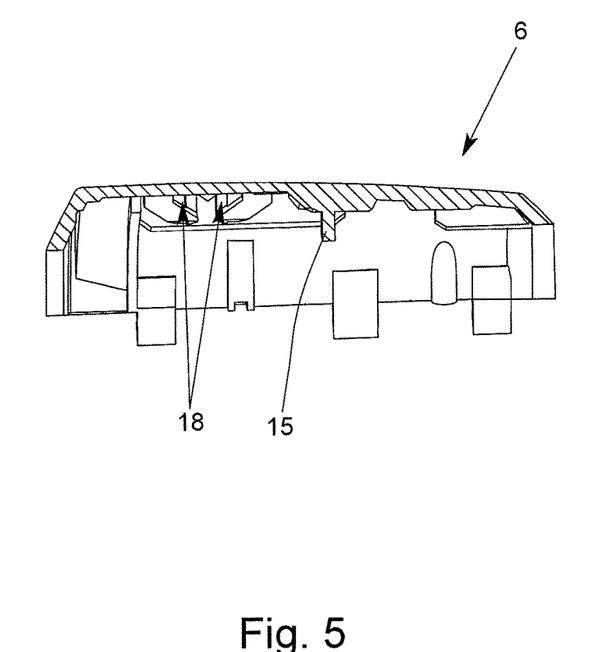
FIG. 5 is a cross-sectional view of an embodiment of a part of a grip structure.

FIG. 5 shows a part of a grip structure 6 in a cross-sectional side view. The grip structure 6 is formed of two parts, wherein a top part is shown in FIG. 5. A generally V-shaped shaft guide 18 is provided in the grip structure 6, into which the lifting arms 17 of the clamping elements 10 engage and with which they interact. In the mounted state, the V-shaped shaft guide 18 leads to the lifting arms 17 sliding along the flanks of the V-shaped shaft guide 18, whereby the clamping element 10 is moved away from the vacuum cleaner suction tube 1. The setting lug 15 is integrally formed with the grip structure 6.

Figure 6:
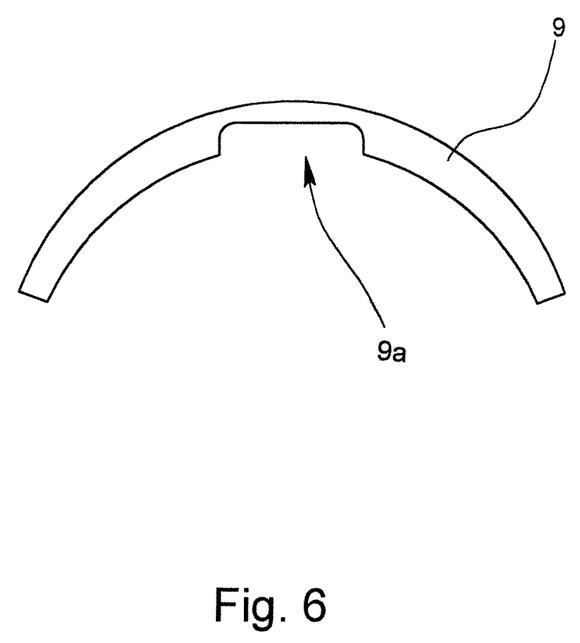
FIG. 6 shows an embodiment of a re-setting means.

FIG. 6 shows an embodiment of a re-setting means 9, which is designed as an arched spring. The re-setting means 9—the arched spring—is cut out of a spring steel sheet and has such an arched shape that the re-setting means 9 is adapted to the outer contour of a guide sleeve 14, and thus, to the outer contour of an inner tube 2. In the central middle section, the re-setting means 9 has a recess 9A with which the re-setting means 9 can be locked in a form-fit manner, for example, with a housing 13.

Figure 7:
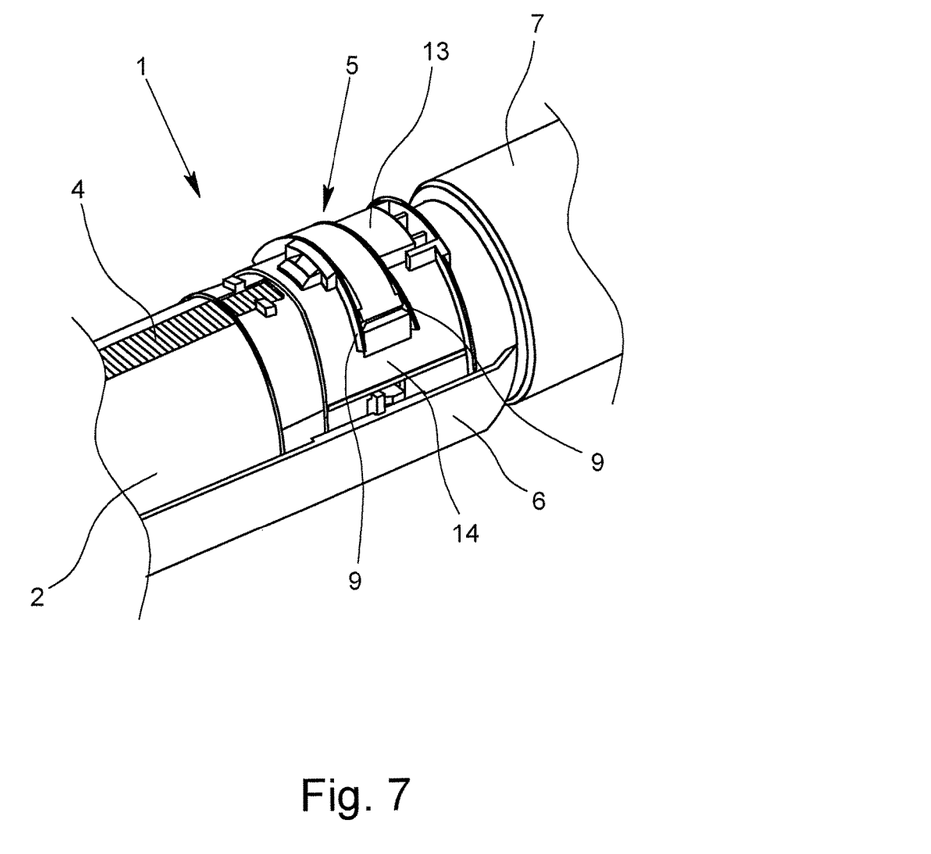
FIG. 7 is a perspective view of an embodiment of a vacuum cleaner suction tube that is partially mounted.

FIG. 7 shows an embodiment of a vacuum cleaner suction tube 1. The inner tube 2 and the actuating mechanism 5 as well as a lower part of a grip structure 6 are shown. A first connecting element 7 is arranged at the end section of the inner tube, which, for example, is used for connecting to a—not shown—suction hose. The outer tube 3 is not shown. The grip structure 6 is formed in two parts and attached to—not shown—the outer tube 3. A guide sleeve 14 is provided on the end in the—not shown—outer tube 3. The inner tube 2 is inserted in the outer tube 3 through the guide sleeve 14. The inner tube 2 has retaining recesses 4 that interact with the actuating mechanism 5. A re-setting means 9 is attached form-fit to the guide sleeve 14, the re-setting means being designed as two arced leaf springs. The locked position of the grip structure 6 is shown, in which the re-setting means 9 is not deflected. The leaf springs of the re-setting means 9 correspond to those shown in the embodiment in FIG. 6.

Figure 8:
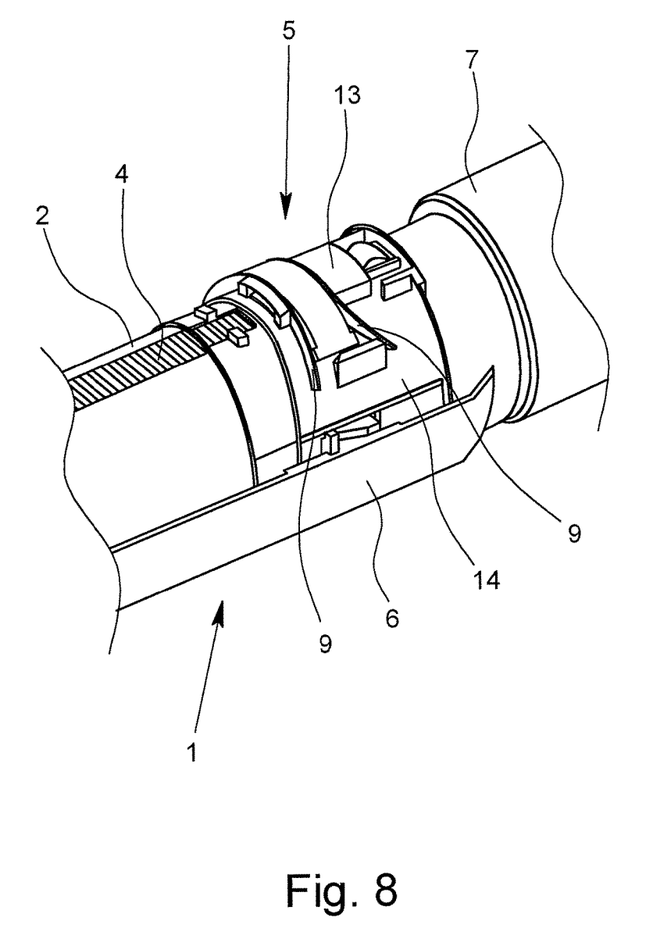
FIG. 8 is a side view of the embodiment of a vacuum cleaner suction tube according to FIG. 7 with the grip structure.

FIG. 8 shows the embodiment according to FIG. 7, wherein the grip structure 6 is shifted into an un-locked position—in the direction of the free end of the outer tube 3—, wherein a movement of the inner tube 2 is enabled, since the retaining recesses 4 are no longer blocked in a form-fit manner. By sliding the grip structure 6 into the unlocked position, one of the arched springs of the re-setting means 9 is strained orthogonally to its arched form and deformed, whereby this arched spring of the re-setting means 9 exerts a re-setting force on the grip structure 6 in order to re-set it to the locked position. The re-setting means 9 is thus—together with the grip structure 6—moved relative to the guide sleeve 14.

Figure 9:
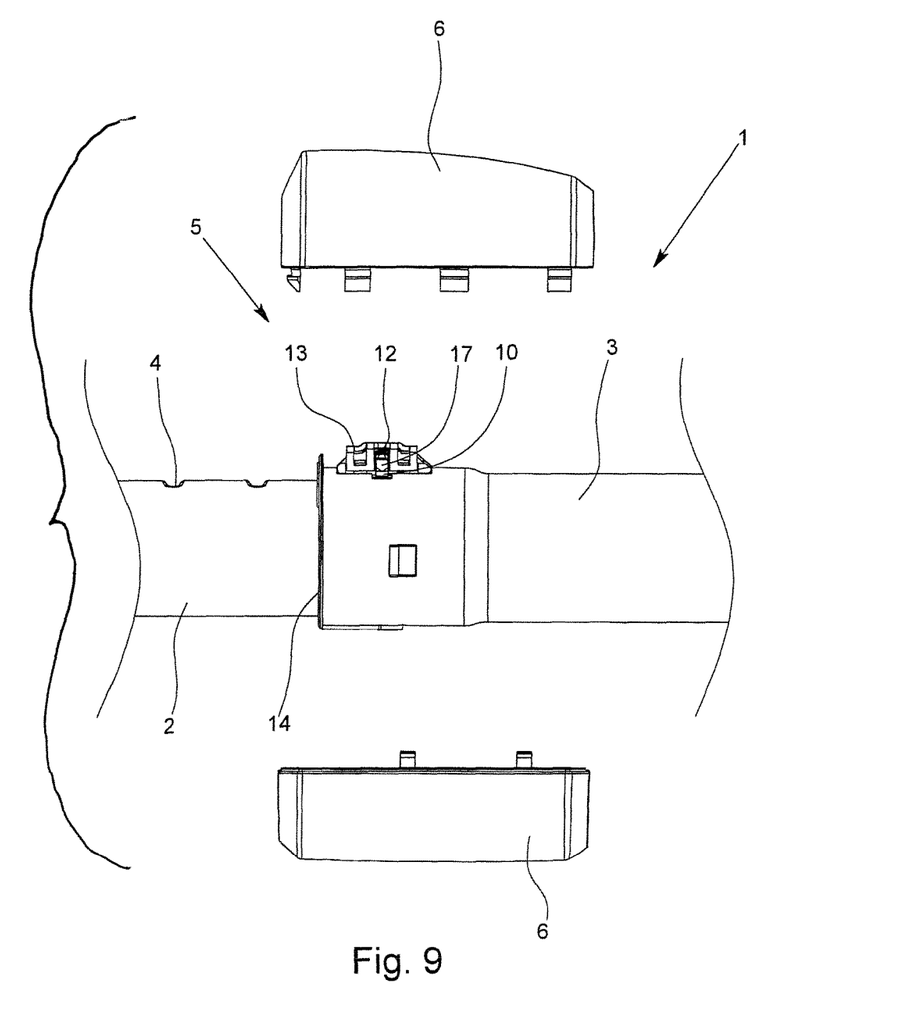
FIG. 9 is a side view of an embodiment of a vacuum cleaner suction tube.

FIG. 9 shows an embodiment of a vacuum cleaner suction tube 1 with an inner tube 2 and an outer tube 3. The inner tube 2 has retaining recesses 4. The outer tube 3 is expanded on its end, so that the guide sleeve 14 can be inserted into the expansion on the end and locked form-fit with the outer tube 3. A re-setting means 9 is arranged on the guide sleeve 14, which, when the grip structure 6 is moved out of the shown locked position, strives to re-set the grip structure 6 back into the locked position. The clamping element 10 is held inside the housing 13 together with the clamp spring 12, which is designed as a spiral spring in this embodiment. The clamping element 10 has lifting arms 17 oriented orthogonally to the longitudinal direction of the vacuum cleaner suction tube 1, which interact with V-shaped shaft guides in the grip structure 6—see also FIG. 5.

Figure 10:
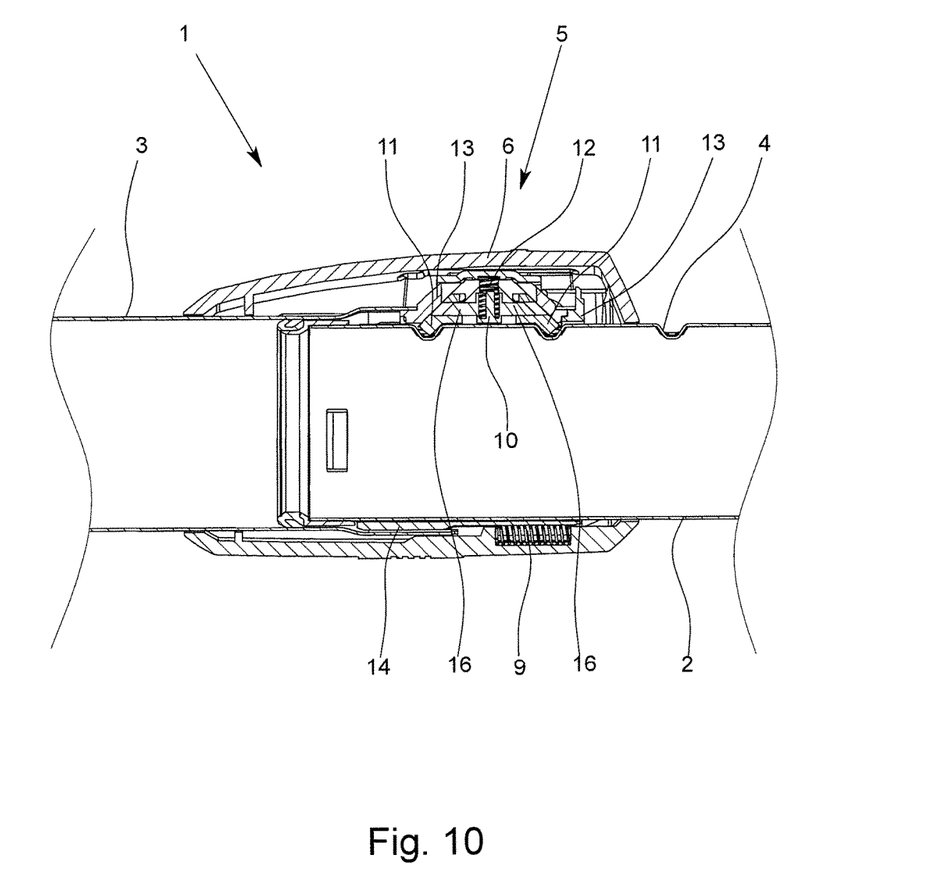
FIG. 10 is a cross-sectional side view of the embodiment of a vacuum cleaner suction tube according to FIG. 9.

FIG. 10 shows the embodiment of a vacuum cleaner suction tube 1 according to FIG. 9 in a cross-sectional side view. The re-setting means is designed as a spiral spring in this embodiment, which is arranged parallel to the longitudinal direction of the vacuum cleaner suction tube 1. The re-setting means 9 is arranged in the grip structure 6. The inner tube 2 has, in turn, retaining recesses 4, which interact with the clamping wedges 11 of the actuating mechanism 5.

The outer tube 3 is expanded on its end that receives inner tube 2, wherein a guide sleeve 14 is inserted in the expansion.

The grip structure 6 encloses the further components of the actuating mechanism 5, in particular, namely, the housing 13, which, in turn, encloses the clamping element 10, the clamping wedges 11 and the clamp spring 12, which is designed as a spiral spring. The clamp spring 12 exerts a force on the clamping element 10 directed orthogonally to the longitudinal axis of the vacuum cleaner suction tube 1. The clamping element 10 has setting arms 16, which clamp form-fit into the openings of the clamping wedges 11, so that both clamping wedges 11 are simultaneously moved away from the longitudinal axis of the vacuum cleaner suction tube 1 with one movement of the clamping element 10.

The clamp spring 12 acts against the movement of the clamping element 10 away from the longitudinal axis of the vacuum cleaner suction tube 1, the clamp spring bracing itself on the housing 13 and, when the clamping element 10 is moved, always strives to re-set the clamping element 10 into the clamping position. The clamping element 10 is, in turn, moved away from the vacuum cleaner suction tube 1 when the grip structure 6 is moved in a direction parallel to the longitudinal direction of the vacuum cleaner suction tube 1. The clamping element 10 and the grip structure 6 interact with one another via—not shown in this figure—lifting arms 17 and V-shaped shaft guides 18.

Figure 11:
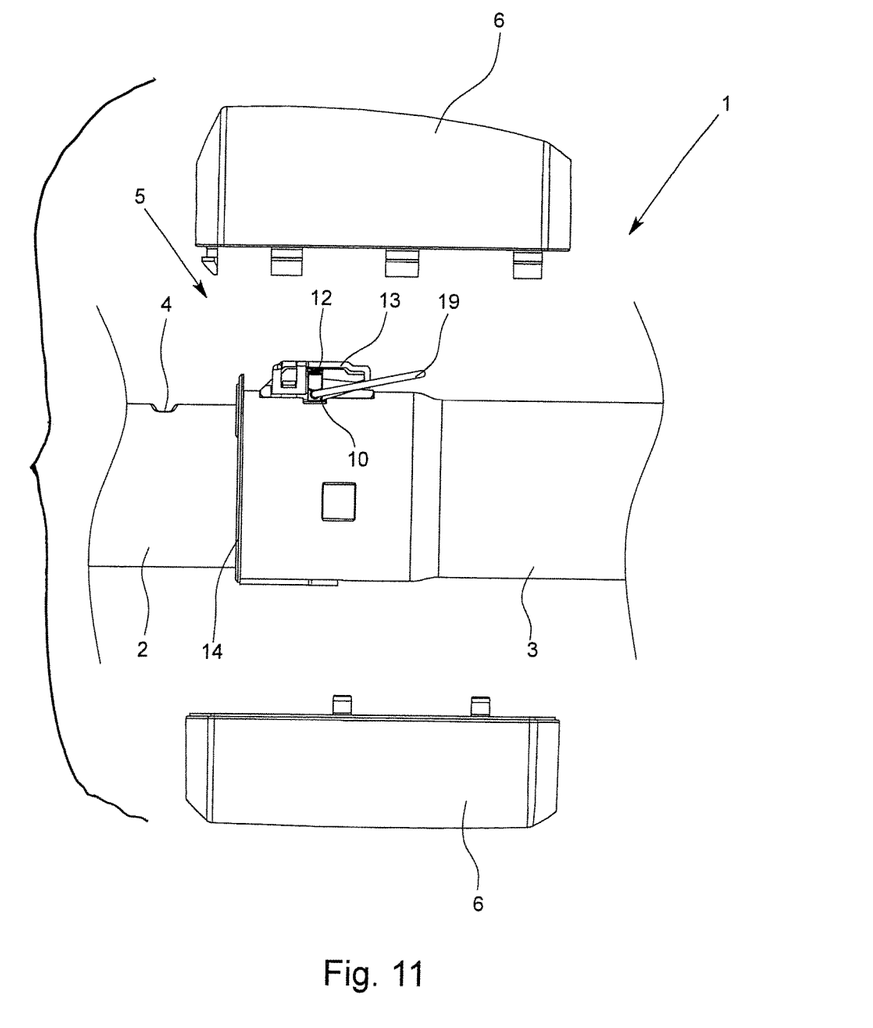
FIG. 11 is a partially exploded side view of an embodiment of a vacuum cleaner suction tube.

FIG. 11 shows an embodiment of a vacuum cleaner suction tube 1, partially assembled, in side view. The outer tube 3 is expanded on its end, wherein a guide sleeve 14 is inserted in the expansion on the end and is locked with the outer tube 3. The inner tube 2 is pushed into the outer tube 3 and has retaining recesses 4. The grip structure 6 is designed in two pieces in this embodiment and is not assembled. In addition to the clamp spring 12, which braces itself on the clamping element 10 and the housing 13, the actuating mechanism 5 includes a pivot bar 19, which is attached to the clamping element 10 and which, in turn, braces itself on a pivot edge on the housing 13 at about the half-way point of its lateral length.

By moving the free end of the pivot bar 19 in the direction of the vacuum cleaner suction tube 1, a movement of the clamping element 10 away from the longitudinal axis of the vacuum cleaner suction tube 1 occurs by means of a lever action, wherein this lever action occurs via the pivot edge. The clamp spring 12 acts against such a movement and, when the pivot bar is moved, always strives to return to the shown position, in particular, namely, the clamping position of the clamping element 10. Movement of the free end of the pivot bar 19 in the direction of the vacuum cleaner suction tube 1 occurs by sliding the grip structure 6 out of the locked position into an un-locked position, namely by influencing the grip structure 6 on the pivot bar 19.

Figure 12:
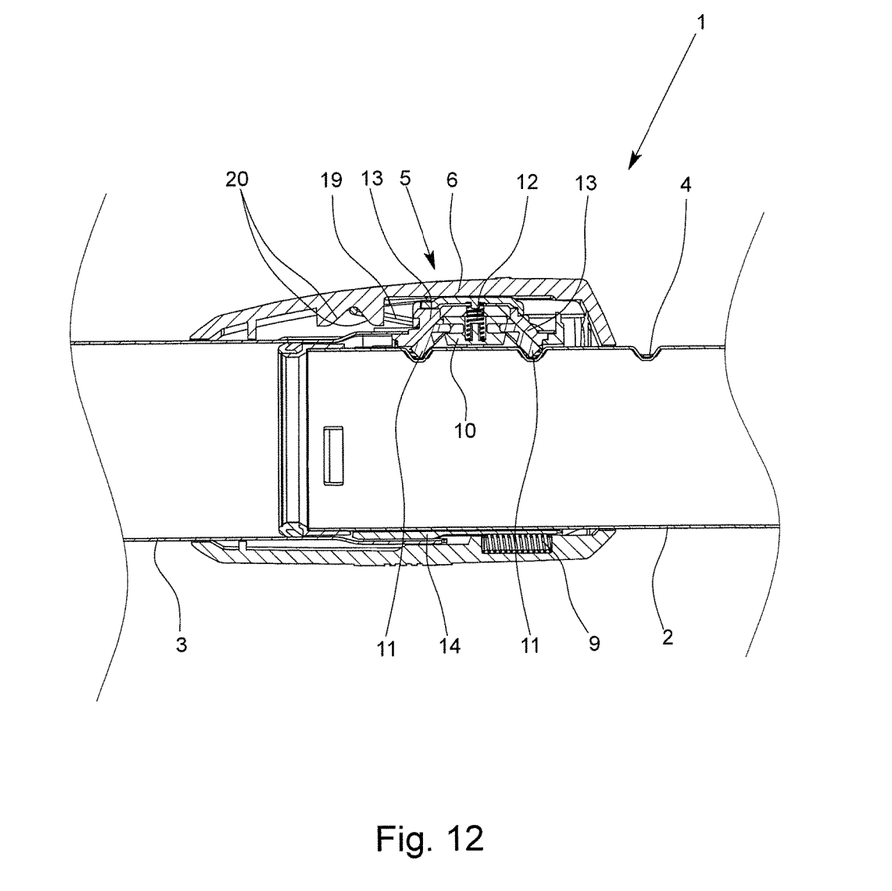
FIG. 12 is a cross-sectional side view of the embodiment of a vacuum cleaner suction tube according to FIG. 11.

FIG. 12 shows the embodiment according to FIG. 11 in a cross-sectional side view. The outer tube is expanded on its end, wherein a guide sleeve 14 is inserted into the expansion on the end. The re-setting means 9 is arranged in the grip structure 6 and acts against a sliding of the grip structure 6 out of the locked position. The pivot bar 19 interacts with two initiating bevels 20 on the grip structure 6, along which the pivot bar 19 glides when the grip structure 6 is moved from the locked position to an un-locked position, so that the free end of the pivot bar 19 is moved in the direction of the vacuum cleaner suction tube 1, whereby the clamping element 10 is moved away from the vacuum cleaner suction tube 1, in particular away from its longitudinal axis. Depending on the sliding direction of the grip structure 6, the pivot bar 19 glides along one of the two initiating bevels 20 of the grip structure 6.

The clamp spring 12, which braces itself on the clamping element 10 and the housing 13, acts against such a movement of the clamping element 10 away from the vacuum cleaner suction tube 1, so that it always strives to reset the clamping element 10 and thus to lock the clamping wedges 11 with the retaining recesses 4. The clamping element 10 is connected with the clamping wedges 11 in such a manner that the clamping wedges 11 clamp into corresponding recesses on the clamping element 10 using projections, whereby the clamping element 10 is connected in a form-fit manner with the clamping wedges 11 and the clamping wedges 11 can be moved toward or away from the vacuum cleaner suction tube simultaneously with the clamping element 10. The clamping wedges 11 gliding, here, along a tilted plane on the housing 13.

What is claimed is:

1. Vacuum cleaner suction tube, comprising:
   at least one inner tube having a plurality of retaining recesses thereon,
   at least one outer tube,
   an actuating mechanism arranged on the outer tube and having at least one grip structure having at least one locked position for fixing a relative position of the inner tube relative to the outer tube and an unlocked position enabling movement of the inner tube relative to the outer tube,
   a re-setting means on the outer tube for re-setting the grip structure back into the locked position, and
   a clamping element and two clamping wedges,
   wherein the grip structure is slidably held in a longitudinal direction of the vacuum cleaner suction tube in a manner enabling the grip structure to move from the at least one locked position into the unlocked position,
   wherein, in the locked position of the grip structure, the clamping element keeps the two clamping wedges engaged with at least one of the plurality of retaining recesses on the inner tube,
   wherein, in the unlocked position, the two clamping wedges enable a sliding of the inner tube relative to the outer tube, and
   wherein, when the grip structure is displaced out of the locked position, the re-setting means exerts a re-setting force for re-setting the grip structure into the locked position,
   wherein the clamping element has a form-fit connection with the two clamping wedges so that both of the clamping wedges can be simultaneously moved with a single movement of the clamping element,
   wherein the clamping element is connected to the grip structure so that the clamping element is able to be moved away from the longitudinal axis of the vacuum cleaner suction tube by sliding of the grip structure out of the locking position, and
   wherein both of the clamping wedges are able to be simultaneously lifted out of engagement with the retaining recesses by moving the clamping element away from the longitudinal axis of the vacuum cleaner suction tube whereby sliding of the inner tube relative to the outer tube is enabled.

2. Vacuum cleaner suction tube according to claim 1, wherein the actuating mechanism additionally includes a clamp spring having a force application direction acting against movement of the clamping element away from a longitudinal axis of the vacuum cleaner suction tube.

3. Vacuum cleaner suction tube according to claim 2, wherein the clamp spring is a double-layer leaf spring.

4. Vacuum cleaner suction tube according to claim 2, wherein the clamping element has two lifting arms that are oriented orthogonal to the longitudinal direction of the vacuum cleaner suction tube and that engage in corresponding V-shaped shaft guides of the grip structure, and wherein sliding the grip structure out of the locked position is adapted to cause the lifting arms to slide up along a respective flank of the V-shaped shaft guide, whereby the clamping element is moved away from the longitudinal axis of the vacuum cleaner suction tube.

5. Vacuum cleaner suction tube according to claim 4, wherein a housing is provided between the grip structure and the outer tube, wherein the clamping element and both clamping wedges are guided in the housing and wherein the lifting arms extend out of sides of the housing.

6. Vacuum cleaner suction tube according to claim 1, wherein a housing is provided between the grip structure and the outer tube, and wherein the clamping element and both clamping wedges are guided in the housing.

7. Vacuum cleaner suction tube according to claim 1, wherein the actuating mechanism includes a guide sleeve and wherein the guide sleeve is held in an end of the outer tube in a form-fit manner.

8. Vacuum cleaner suction tube according to claim 7, wherein the re-setting means is attached to the guide sleeve.

9. Vacuum cleaner suction tube according to claim 1, wherein a setting lug is provided on the grip structure, the setting lug extending through a recess of the outer tube, and wherein the setting lug interacts with the re-setting means.

10. Vacuum cleaner suction tube according to claim 1, wherein the re-setting means comprises at least one arched leaf spring that is strained perpendicular to its arched form.

11. Vacuum cleaner suction tube according to claim 1, wherein the clamping element comprises a clamping plate which includes two setting arms arranged in a common plane, and wherein each setting arm is engaged in a form-fit manner with a respective one of the two clamping wedges and wherein the setting arms are oriented parallel to the longitudinal direction of the vacuum cleaner suction tube.

12. Vacuum cleaner suction tube according to claim 1, wherein the actuating mechanism includes a pivot bar that is in contact with the grip structure and with the clamping element so that sliding of the grip structure out of the locked position actuates the pivot bar, whereby the clamping element is moved away from the longitudinal axis of the vacuum cleaner suction tube.

13. Vacuum cleaner suction tube according to claim 12, wherein at least one initiating bevel is provided and wherein the pivot bar slides over the initiating bevel when the grip structure is moved out of the locked position, whereby the pivot bar is actuated.

14. Vacuum cleaner suction tube according to claim 1, wherein the grip structure encloses an entire circumference of the outer tube.

15. Vacuum cleaner suction tube, comprising:
   at least one inner tube having a plurality of retaining recesses,
   at least one outer tube an actuating mechanism arranged on the outer tube, the actuating mechanism having at least one grip structure having a locked position for fixing the relative position of the inner tube relative to the outer tube and at least one unlocked position enabling movement of the inner tube relative to the outer tube, a re-setting means for re-setting the grip structure back into the locked position, a clamping element and two clamping wedges,
   wherein the grip structure is slidably held in a longitudinal direction of the vacuum cleaner suction tube in a manner enabling the grip structure to be movable from the locked position into the at least one unlocked position,
   wherein, in the locked position of the grip structure, the clamping element keeps the clamping wedges engaged with the retaining recesses on the inner tube,
   wherein, in the at least one unlocked position, sliding of the inner tube relative to the outer tube is enabled by the clamping wedges,
   wherein displacement of the grip structure out of the locked position enables the re-setting means exerts a re-setting force for re-setting the grip structure into the locked position, and
   wherein the re-setting means comprises at least one arched leaf spring, which is deformed orthogonally to its arched shape by displacing the grip structure and thereby exerts a re-setting force on the grip structure.

\* \* \* \* \*